(12) United States Patent
Oboodi et al.

(10) Patent No.: US 7,297,367 B2
(45) Date of Patent: Nov. 20, 2007

(54) INORGANIC SOLID LUBRICANT FOR HIGH TEMPERATURE FOIL BEARING

(75) Inventors: Reza Oboodi, Morris Plains, NJ (US); James Piascik, Randolph, NJ (US)

(73) Assignee: Honeywell International, Inc., Morristown, NJ (US)

( * ) Notice: Subject to any disclaimer, the term of this patent is extended or adjusted under 35 U.S.C. 154(b) by 662 days.

(21) Appl. No.: 10/767,111

(22) Filed: Jan. 28, 2004

(65) Prior Publication Data
US 2005/0163406 A1  Jul. 28, 2005

(51) Int. Cl.
*B05D 3/02*  (2006.01)
(52) U.S. Cl. .................. 427/226; 427/299; 427/307; 427/372.2; 427/374.1; 427/376.1; 427/402
(58) Field of Classification Search ........... 427/226, 427/299, 307, 372.2, 374.1, 376.1, 402
See application file for complete search history.

(56) References Cited

U.S. PATENT DOCUMENTS

| | | | |
|---|---|---|---|
| RE24,017 E | * | 6/1955 | Henricks .................. 428/470 |
| 3,199,934 A | | 8/1965 | Van Wyk |
| 3,205,565 A | * | 9/1965 | Macdonald .............. 428/556 |
| 3,419,363 A | | 12/1968 | Sliney |
| 3,508,955 A | | 4/1970 | Sliney |
| 3,809,443 A | | 5/1974 | Cherubim |
| 3,878,113 A | | 4/1975 | Campbell et al. |
| 3,953,343 A | | 4/1976 | Sliney |
| 3,954,479 A | | 5/1976 | Jahn |
| 4,136,211 A | | 1/1979 | Sliney |
| 4,214,905 A | | 7/1980 | Sliney |
| 4,435,839 A | | 3/1984 | Gu et al. |
| 4,459,047 A | | 7/1984 | Silver |
| 4,654,939 A | | 4/1987 | Silver |
| 4,728,448 A | | 3/1988 | Sliney |
| 5,034,187 A | | 7/1991 | Sliney et al. |
| 5,866,518 A | | 2/1999 | Dellacorte et al. |
| 2002/0106138 A1 | | 8/2002 | Akizuki et al. |

* cited by examiner

*Primary Examiner*—Elena Tsoy
(74) *Attorney, Agent, or Firm*—Ingrassia Fisher & Lorenz

(57) ABSTRACT

Inorganic solid lubricant coatings and processes for applying a solid lubricant coating to a substrate surface. A process for applying the solid lubricant coating may involve applying a precursor material to the substrate surface, and thereafter melting at least one inorganic bonding component of the precursor material to bond the solid lubricant coating to the substrate surface. The precursor material may comprise an organic polymer binder, at least one wear-resistant component, and at least one friction-reducing constituent, in addition to the at least one bonding component.

20 Claims, 4 Drawing Sheets

INORGANIC SOLID LUBRICANT FOR HIGH TEMPERATURE FOIL BEARING

BACKGROUND OF THE INVENTION

The present invention generally relates to inorganic solid lubricant coatings, and to methods for forming such solid lubricant coatings.

Compliant foil air bearings (hereafter, foil bearings) are at the forefront of oil-free turbomachinery, in which gas turbine engines with hydrodynamic bearings use air instead of oil as the working fluid. Foil bearings have several commercial applications, such as air cycle machines, turbocompressors, and microturbines, as well as aircraft gas turbine engines.

The rotating shaft of a foil bearing may act as an air pump to create a thin layer of high pressure air between the shaft or journal and the top foil. As a result, during normal operation air serves as lubricant for the bearing. To protect the bearing during start-up and shut down, i.e., in the absence of high pressure air between the shaft and top foil, solid lubricants have been used. Such solid lubricants have typically been applied to the top foil, but may also be applied to the shaft.

Prior art solid lubricants for foil bearings have been applied to a substrate (e.g., top foil or shaft) as liquids, for example, by spraying the liquid on the substrate surface, or by dipping the substrate in the liquid. Such liquids of prior art solid lubricants have used organic polymer constituents, as a lubricant per se, or as a binder. For example, U.S. Pat. No. 4,435,839 (to Gu, et al.) discloses a liquid coating comprising an organic thinning liquid, an organic polyimide binder, and an organic wetting agent; as well as a process for applying the liquid to a substrate by spraying nine (9) sub-coats of the liquid, with a series of intermittent curing steps (one hour in an oven), and intermittent sanding steps.

Foil bearings using conventional organic-based solid lubricants are typically limited to an operating temperature of not more than about 350° C., and therefore cooling of the foil bearing components during operation is required. Such cooling consumes fuel and increases both operating cost and weight.

An inorganic solid lubricant was described in U.S. Pat. No. 5,866,518 (to Dellacorte et al.), which discloses a self-lubricating composite comprising a chromium oxide (e.g., chromic oxide, $Cr_2O_3$), a metal binder comprising a Cr/Ni or Cr/Co alloy, a metal fluoride, and, optionally, a metal lubricant. A milled powder mix of the composite is deposited on the substrate by plasma spraying, and the like; or, free-standing bodies of the composite may be formed by cold isostatic pressing or hot isostatic pressing.

As can be seen, there is a need for an inorganic solid lubricant adapted for operating temperatures in excess of those tolerated by organic-based solid lubricants. There is a further need for an inorganic solid lubricant which can be readily and inexpensively applied to a substrate in a simple and straightforward process, such that processing costs are decreased, and productivity is increased. There is also a need for a process for coating superalloy components or other substrates with an inorganic solid lubricant by applying a precursor material to the substrate, wherein the precursor material includes at least one inorganic bonding component, and wherein the inorganic bonding components are melted on the substrate surface, at a temperature insufficient to thermally damage the substrate, whereby the solid lubricant coating is bonded to the substrate surface.

SUMMARY OF THE INVENTION

In one aspect of the present invention, there is provided a method for applying a solid lubricant coating to a substrate, the method comprising preparing a surface of the substrate; applying a precursor material to the substrate surface, wherein the precursor material comprises at least one inorganic bonding component; and forming the solid lubricant coating on the substrate surface from the precursor material. The at least one inorganic bonding component may be melted in situ on the substrate surface, whereby the solid lubricant coating is bonded to the substrate surface.

In another aspect of the present invention, there is provided a method for forming a solid lubricant coating from a precursor material applied to a substrate surface, the method comprising applying the precursor material to the substrate surface, the precursor material comprising a plurality of inorganic components and an organic polymer binder, the plurality of inorganic components including at least one bonding component; removing the organic polymer binder from the precursor material; and, via the at least one bonding component, bonding the plurality of inorganic components to the substrate surface.

In still another aspect of the present invention, there is provided a method for forming a solid lubricant coating on a substrate, comprising providing the substrate; preparing a surface of the substrate; providing a precursor material, wherein the precursor material comprises a plurality of inorganic components, a polymer binder, and a solvent, the plurality of inorganic components including at least one bonding component, at least one wear-resistant component, and at least one friction-lowering component; applying the precursor material to the substrate surface; heating the precursor material, in situ, on the substrate surface to a first temperature sufficient to remove the solvent from the precursor material; heating the precursor material, in situ, on the substrate surface to a second temperature sufficient to remove the polymer binder from the precursor material; heating the precursor material, in situ, on the substrate surface to a third temperature sufficient to melt the plurality of inorganic components on the substrate surface; and cooling the plurality of inorganic components on the substrate surface, whereby the solid lubricant coating is bonded to the substrate surface.

In yet another aspect of the present invention, a method for applying a solid lubricant coating to a substrate surface may include applying a first precursor material to the substrate surface, wherein the first precursor material comprises a first plurality of inorganic components and a plurality of organic constituents; removing the plurality of organic constituents from the first precursor material; heating the first plurality of inorganic components to a melt temperature of the first plurality of inorganic components, wherein the first plurality of inorganic components includes at least one eutectic mixture; and bonding the first plurality of inorganic components to the substrate surface to form a first layer of the solid lubricant coating on the substrate surface.

In a further aspect of the present invention, there is provided a method for making a precursor material, the method comprising providing inorganic components of the precursor material, and combining the inorganic components with a polymer binder and a solvent to provide the precursor material. The inorganic components may comprise at least one bonding component, at least one wear-resistant component, and at least one friction-lowering component. The at least one bonding component may comprise at least one eutectic mixture, and the precursor material may have a viscosity of from about 50,000 to 300,000 Centipoise.

In still a further aspect of the present invention, a precursor material may comprise at least one bonding component; at least one wear-resistant material; at least one friction-lowering material such as a precious metal, a metal fluoride, or a metal sulfide; and an organic polymer binder. The at least one bonding component may comprise at least one eutectic mixture, and the at least one eutectic mixture may comprise a metal sulfide or a metal oxide.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides solid lubricant coatings for use at operating temperatures up to at least about 550° C. Solid lubricant coatings of the instant invention may be applied to various substrates, including substrates comprising superalloys, such as nickel-based superalloys. The present invention also provides a method for depositing solid lubricant coatings on a substrate by applying a precursor material to the substrate, e.g., in the form of a paste, and curing the precursor material to form a hard coating of the solid lubricant bonded to the substrate surface.

As an example, the present invention may find applications in foil bearings, e.g., in gas turbine engines, as well as in many other types of components or bearings requiring high temperature lubrication, such as in oil-free bearings and oil-less pumps, and the like.

The present invention differs from the prior art in providing an inorganic solid lubricant coating that may be applied to a substrate as a precursor material, which may be in the form of a paste, using a simple, straightforward, and inexpensive application process, wherein the solid lubricant coating lacks an organic constituent.

In further contrast to the prior art, a process for forming a solid lubricant coating of the present invention on a substrate surface may involve applying a precursor material, and thereafter melting at least one inorganic bonding component of the precursor material to bond the solid lubricant coating to the substrate surface.

In still further contrast to the prior art, a process for forming a solid lubricant coating, according to one embodiment of the present invention, may involve sequentially applying two or more precursor materials to a substrate surface, wherein the resultant solid lubricant coating formed on the substrate comprises two or more solid lubricant layers having the same or different compositions.

Figure 1:
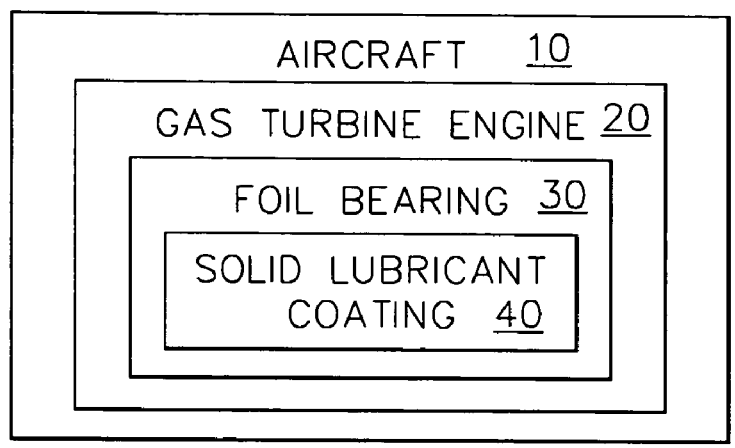
FIG. 1 is a block diagram schematically representing an aircraft having a solid lubricant coating on a foil bearing, according to one embodiment of the invention.

FIG. 1 is a block diagram schematically representing an aircraft 10, according to one embodiment of the invention. Aircraft 10 may include one or more gas turbine engines 20. Each gas turbine engine 20 may include one or more foil bearings 30 (see FIG. 2A). Each foil bearing 30 may have a solid lubricant coating bonded to a surface of one or more components of foil bearing 30 (see FIGS. 2B, 3).

Figure 2A:
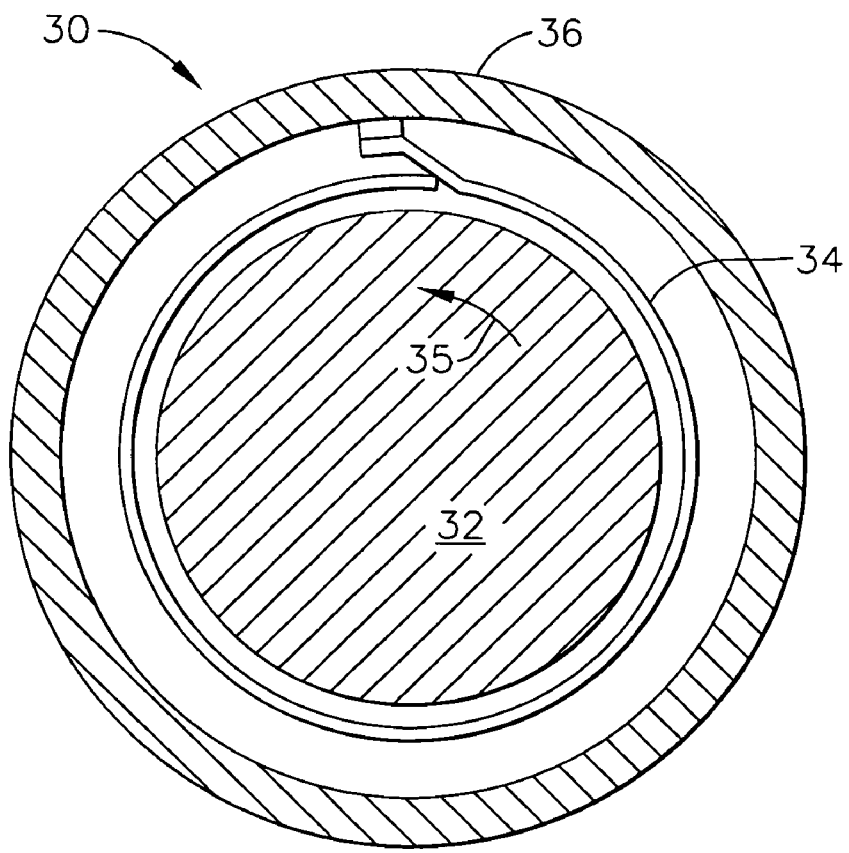
FIG. 2A is a cross-sectional view of a foil bearing showing the juxtaposition of a top foil and a shaft, according to another embodiment of the invention.

FIG. 2A is a cross-sectional view of a foil bearing 30 showing the juxtaposition of a shaft 32 and a top foil 34 within a bearing sleeve 36. Rotation of shaft 32 is indicated by an arrow 35. During operation, rotating shaft 32 may act as an air pump to create a layer of high-pressure air (not shown) between top foil 34 and shaft 32, such that the layer of air serves as lubricant. At start up and shut down, i.e., in the absence of the air layer, foil bearing 30 may be protected by a solid lubricant. In particular, and according to one aspect of the present invention, foil bearing 30 may be protected by solid lubricant coating 40 (see for example, FIGS. 2B, 3, 4-7). Solid lubricant coating 40 is omitted from FIG. 2A for the sake of clarity. One or more bump foils (not shown), disposed between top foil 34 and bearing sleeve 36, may serve both as a spring, to tailor bearing compliance, and to minimize leakage of the air layer. Bump foil(s) of foil bearing 30 are omitted from FIG. 2A for the sake of clarity. Foil bearings, in general, are known in the art.

Figure 2B:
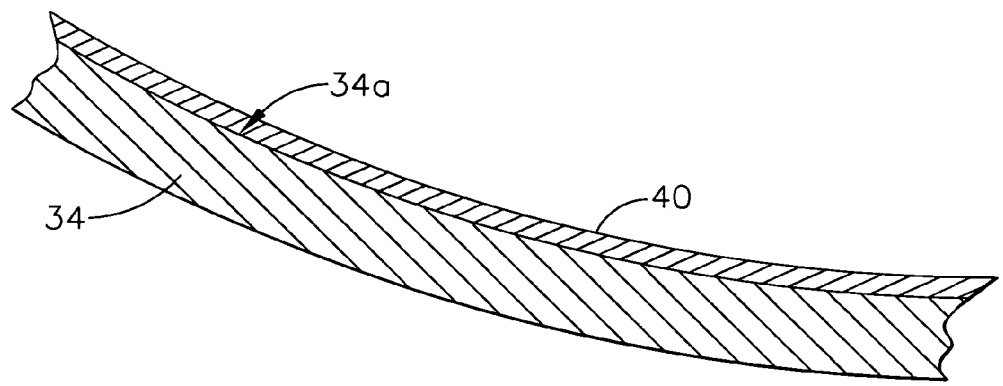
FIG. 2B is an enlarged view of a portion of the top foil of FIG. 2A showing a solid lubricant coating on a surface of the top foil, according to the invention.

FIG. 2B is an enlarged view of a portion of top foil 34 of foil bearing 30 of FIG. 2A, according to one embodiment of the invention. Top foil 34 may include a top foil surface 34a. Solid lubricant coating 40 of the present invention may be bonded to top foil surface 34a. Solid lubricant coating 40 may have a thickness in the range of typically from about 1 to 25 mils or more, usually from about 2 to 20 mils, and often from about 5 to 15 mils. Shaft 32 is omitted from FIG. 2B for the sake of clarity.

Solid lubricant coating 40 may include the properties of both wear-resistance and friction-lowering. For example, solid lubricant coating 40 may resist wear during contact with other materials or components, and at the same time solid lubricant coating 40 may decrease the coefficient of friction during contact with other materials or components. Accordingly, solid lubricant coating 40 may comprise one or more wear-resistant components and one or more friction-lowering components (as described hereinbelow). The one or more wear-resistant components and the one or more friction-lowering components may be separate components of solid lubricant coating 40. Alternatively, one or more components of solid lubricant coating 40 may be bifunctional, i.e., may serve a dual role as both a wear-resistant component and as a friction-lowering component.

Solid lubricant coating 40 may further exhibit the property of bonding to a substrate surface. For example, solid lubricant coating 40 may be bonded to top foil surface 34a. Accordingly, solid lubricant coating 40 may comprise at least one bonding component. The at least one bonding component may comprise inorganic materials and may include at least one eutectic mixture. Each eutectic mixture may melt at a temperature lower than a melting temperature of individual constituents of the eutectic mixture, such that solid lubricant coating 40 may melt on, and bond to, a substrate at a temperature sufficiently low to prevent damage to the substrate.

The at least one bonding component of solid lubricant coating 40 may be separate components of solid lubricant coating 40. Alternatively, one or more components of solid lubricant coating 40 may be bifunctional or trifunctional, i.e., may serve a dual or triple role as a bonding component as well as a wear-resistant component and/or as a friction-lowering component.

Figure 4:
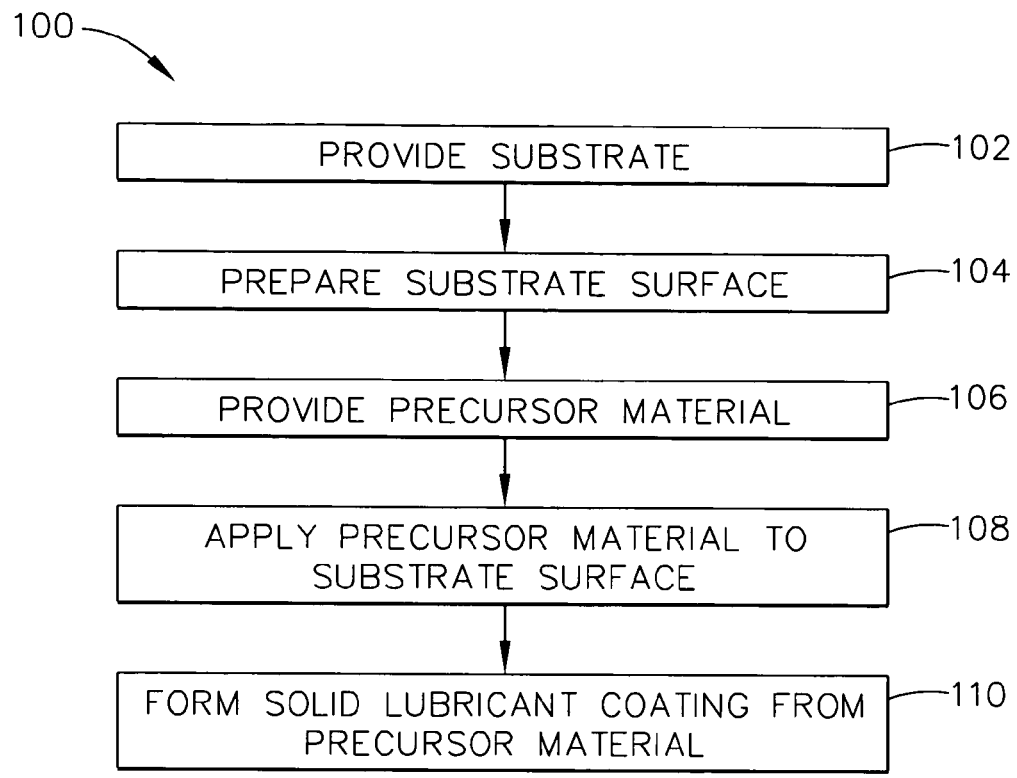
FIG. 4 schematically represents a series of steps involved in a method for applying a solid lubricant to a substrate, according to one embodiment of the invention.
Figure 6:
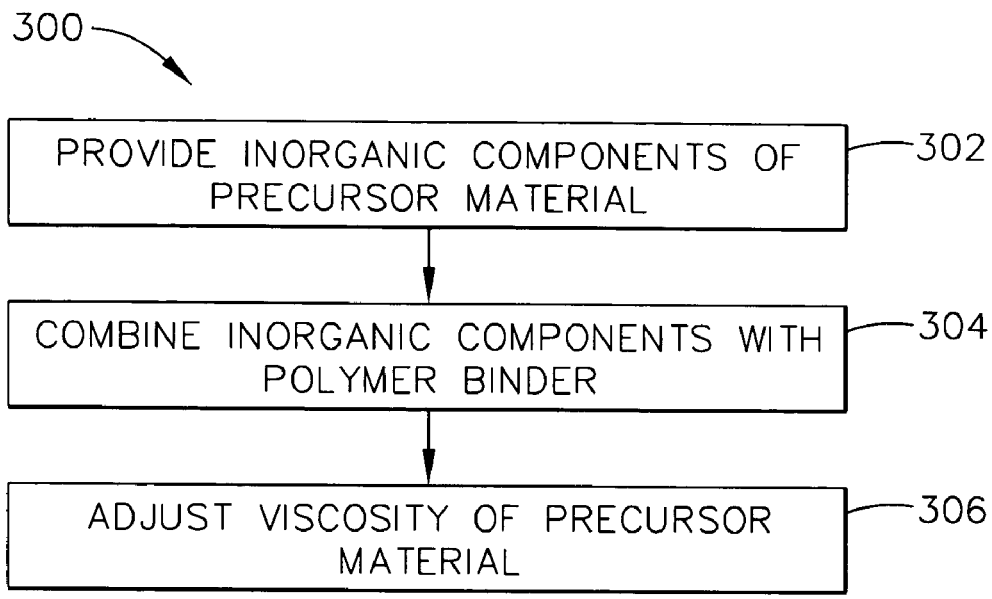
FIG. 6 schematically represents a series of steps involved in a method for making a precursor material, according to another embodiment of the invention.
Figure 7:
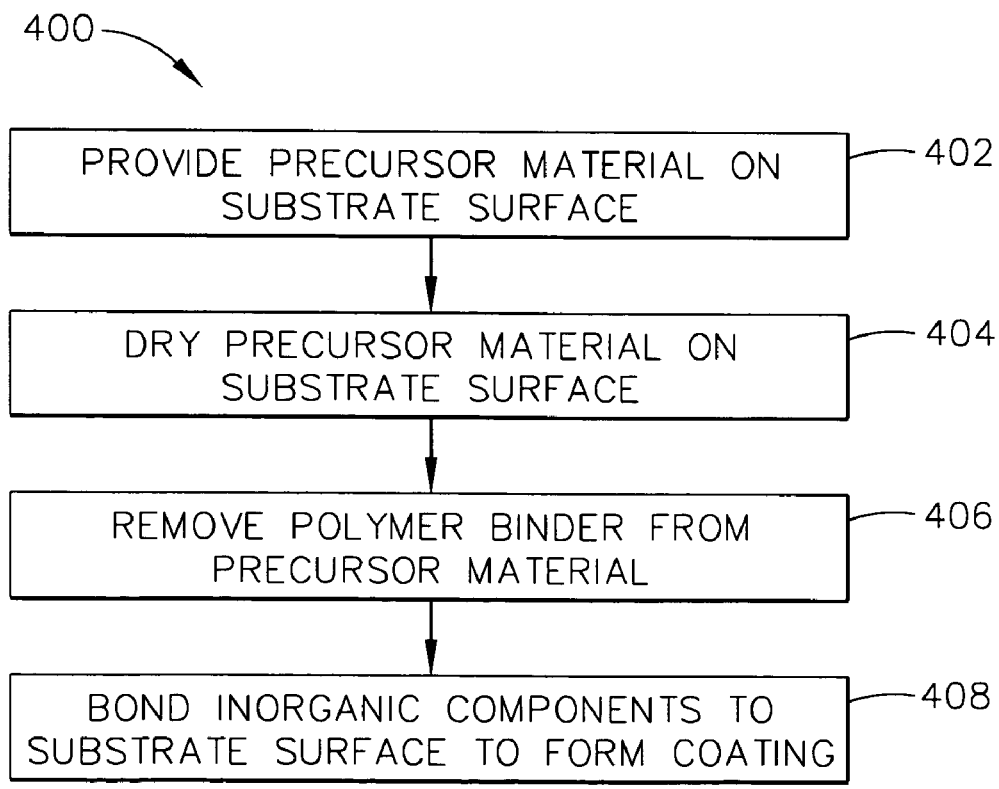
FIG. 7 schematically represents a series of steps involved in a method for forming a solid lubricant coating from a precursor material applied to a substrate surface, according to another embodiment of the invention.

Solid lubricant coating 40 may be formed from a precursor material (see FIGS. 4, 6, 7). Each of the wear-resistant components, friction-lowering components, and bonding components may comprise inorganic components of the precursor material.

Examples of bonding components of the precursor material may include, without limitation, one or more of the following eutectic mixtures: silver sulfide/copper sulfide, silver sulfide/lead sulfide, silver sulfide/bismuth sulfide, nickel oxide/vanadium pentoxide, and calcium fluoride/magnesium fluoride; wherein each pair of compounds represents a mixture which may melt at or near the eutectic temperature. The melt temperature of the inorganic components of the precursor material can be tailored by varying the composition of the one or more eutectic mixtures.

Examples of wear-resistant components of the precursor material may include, without limitation, at least one metal oxide such as nickel oxide, aluminum oxide, chromic oxide, and barium oxide.

Examples of friction-lowering components of the precursor material may include, without limitation, at least one metal sulfide, at least one metal fluoride, or at least one precious metal. Examples of friction-lowering precious metals include, without limitation, Ag, Au, Pt, and the like.

The precursor material may still further comprise a polymer binder. The polymer binder may be an organic polymer, such as ethyl cellulose or nitrocellulose. The precursor material may still further comprise a solvent. The solvent may be an organic solvent, such as terpineol or pine oil and the like.

A substrate surface, such as a surface of a superalloy component of a foil bearing, may be coated with solid lubricant coating 40 by applying the precursor material to the substrate surface; removing the solvent and polymer binder, in situ, from the applied precursor material; and melting the inorganic components of the precursor material such that the inorganic components of the precursor material wet the substrate surface. In this manner, at least one bonding component of the precursor material may bond the inorganic components of the precursor material to the substrate surface and to each other. As a result, solid lubricant coating 40 is formed on, and bonded to, the substrate surface.

Figure 3:
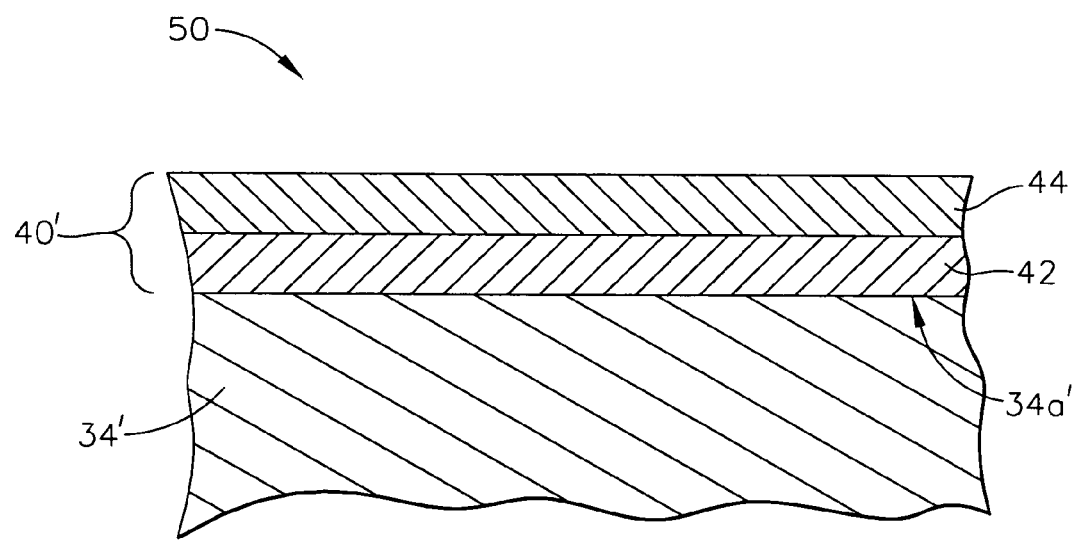
FIG. 3 is a sectional view of a coated component schematically representing a substrate having a solid lubricant coating thereon, according to another embodiment of the invention.

FIG. 3 is a sectional view of a coated component 50, according to another embodiment of the invention. Coated component 50 may include a substrate 34' which may have a solid lubricant coating 40' bonded thereto. Solid lubricant coating 40' may comprise a first solid lubricant layer 42, which may be bonded to substrate surface 34a'. Solid lubricant coating 40' may further comprise a second solid lubricant layer 44, which may be bonded to first solid lubricant layer 42.

First and second solid lubricant layers 42, 44, respectively, may be sequentially applied to substrate 34' by removing the solvent and polymer binder, in situ, from an applied precursor material, and melting the inorganic components of the precursor material. For example, first solid lubricant layer 42 may be applied to substrate 34' by applying a first precursor material to substrate surface 34a', removing organic constituents of the first precursor material, and melting the inorganic components of the first precursor material to bond first solid lubricant layer 42 to substrate surface 34a'. Thereafter, second solid lubricant layer 44 may be applied to substrate 34' by applying a second precursor material to first solid lubricant layer 42, removing organic constituents of the second precursor material, and melting the inorganic components of the second precursor material to bond second solid lubricant layer 44 to first solid lubricant layer 42.

Although two layers, i.e., first and second solid lubricant layers 42, 44, respectively, are shown in FIG. 3, according to various embodiments of the present invention, additional layers of solid lubricant may also be applied to substrate 34'.

The composition of the first and second precursor material may be the same or different. According to one aspect of the present invention, the composition of the first precursor material, and of any subsequently applied precursor material(s), may be tailored to accentuate the properties of bonding, wear-resistance, or friction-lowering according to the desired characteristics of the resultant solid lubricant coating. As an example, the composition of the first precursor material may be tailored to accentuate bonding of first solid lubricant layer 42 to substrate surface 34a', while the composition of a second precursor material may be tailored to accentuate the wear-resistance or friction-lowering properties of second solid lubricant layer 44.

FIG. 4 schematically represents a series of steps involved in a method 100 for applying a solid lubricant coating to a substrate, according to one embodiment of the invention. Step 102 may involve providing a substrate to be coated with the solid lubricant coating of the instant invention. By way of example, the substrate provided in step 102 may be any substrate which requires a solid lubricant for high temperature, oil-free lubrication. The substrate may comprise a metal or alloy, such as a superalloy. As an example, the substrate may comprise a component of a foil bearing, or the like, which may comprise, e.g., a nickel-based superalloy.

Step 104 may involve preparing the substrate surface to be coated with the solid lubricant coating. Step 104 may involve any combination of: cleaning, degreasing, chemically etching, rinsing, drying, and oxidizing the substrate surface (see, for example, method 200 of FIG. 5, infra).

Step 106 may involve providing a precursor material for application to the substrate surface to be coated with the solid lubricant coating. The precursor material may comprise a plurality of organic constituents in addition to a plurality of inorganic components. The organic constituents of the precursor material may include an organic polymer binder and an organic solvent. The inorganic components of the precursor material may include one or more wear-resistant components, one or more friction-lowering components, and one or more bonding components, as described in greater detail elsewhere herein (for example, with reference to FIG. 2B). A method (method 300) for making a precursor material, according to one aspect of the instant invention, is described hereinbelow with reference to FIG. 6.

Step 108 may involve applying the precursor material of step 106 to the substrate surface to be coated with the solid lubricant coating. The precursor material may be in the form of a paste. The precursor material may have a viscosity typically in the range of from about 50,000 to 300,000 Centipoise, usually from about 100,000 to 300,000 Centipoise, and often from about 100,000 to 250,000 Centipoise. The viscosity of the precursor material may be adjusted prior to application to the substrate surface to be coated with the solid lubricant coating. The viscosity of the precursor material may be adjusted according to the mode of application of the precursor material to the substrate surface to be coated with the solid lubricant coating.

As an example, the precursor material may be applied to the substrate surface by thick film screen printing or tape transfer. Both thick film screen printing and tape transfer application techniques are well known in the art. In the case of thick film screen printing, any remaining mesh marks on the applied precursor material may be removed by polishing, as is also well known in the art. Application techniques for applying the precursor material to the substrate surface, other than thick film screen printing and tape transfer, are also within the scope of the instant invention.

Step 110 may involve forming the solid lubricant coating from the precursor material, wherein the solid lubricant coating may be bonded to the substrate surface. Step 110 may involve removing the organic constituents of the precursor material prior to heating the inorganic components of the precursor material to a temperature sufficient to melt the inorganic components.

The inclusion of a eutectic mixture in the precursor material may enable melting of the inorganic components at a temperature below that at which the substrate may sustain thermally-induced damage. Typically, the melting temperature of the inorganic components of the precursor material may be in the range of from about 600 to 750° C., usually from about 600 to 725° C., and often from about 600 to 700° C.

Formation of a solid lubricant coating from a precursor material applied to a substrate surface, according to certain embodiments of the instant invention, is described in greater detail with respect to method 400 (see FIG. 7).

Figure 5:
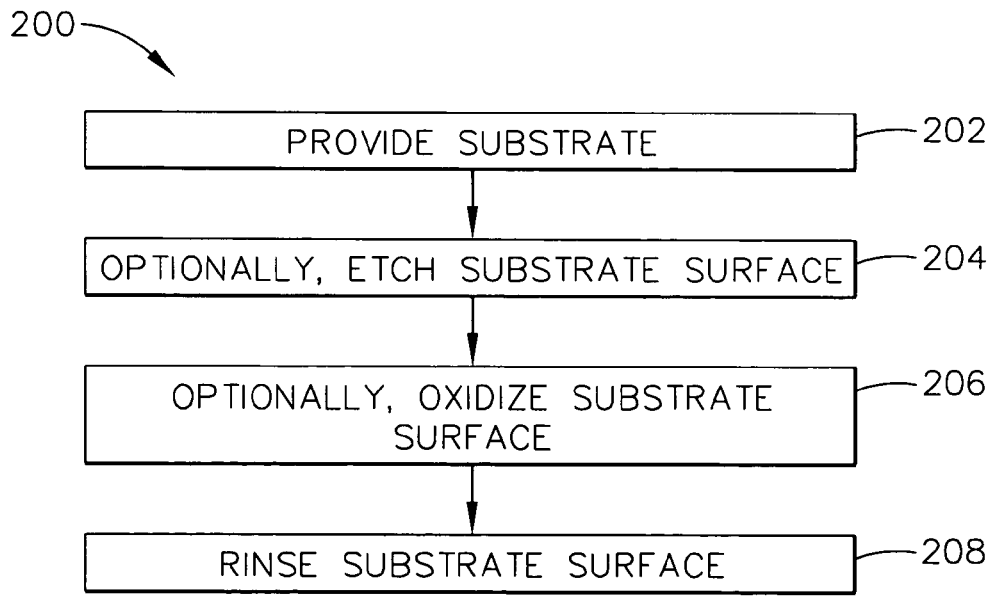
FIG. 5 schematically represents a series of steps involved in a method for preparing a substrate surface for forming a solid lubricant coating thereon, according to another embodiment of the invention.

FIG. 5 schematically represents a series of steps involved in a method 200 for preparing a substrate surface for forming a solid lubricant coating thereon, according to another embodiment of the invention. Method 200 may serve to prepare the substrate surface to promote bonding of the solid lubricant coating thereto. Step 202 may involve providing a substrate to be coated with the solid lubricant coating of the instant invention, essentially as described for step 102 of method 100, supra.

Step 204 may involve etching the substrate surface. As an example, the substrate surface may be chemically etched to provide a micro-roughened surface adapted for bonding thereto a solid lubricant coating of the present invention. The substrate surface may be chemically etched by applying thereon a chemical etchant, such as a solution of ferric chloride (e.g., 40 wt. % ferric chloride in water), a dilute mineral acid, or the like. A chemical etchant applied to the substrate surface in step 204 may simultaneously etch, clean, and degrease the substrate surface.

Step 206 may involve oxidizing the substrate surface to form an oxide film on the substrate surface. For example, a superalloy substrate surface may be oxidized by exposure to heat in the presence of air. Formation of surface oxide films on metal substrates is well known in the art. According to various embodiments of the present invention, step 206 may be performed after step 204; or, step 206 may be performed in lieu of step 204.

Step 208 may involve rinsing the substrate surface, for example, rinsing the substrate surface with deionized water, to remove any traces of chemical etchant, dust, and the like.

FIG. 6 schematically represents a series of steps involved in a method 300 for making a precursor material, according to another embodiment of the invention. Step 302 may involve providing inorganic components of the precursor material. The inorganic components of the precursor material may include one or more wear-resistant components, one or more friction-lowering components, and one or more bonding components, as described in greater detail elsewhere herein (for example, with reference to FIG. 2B). The inorganic components of the precursor material may be milled to form a powder mixture of the inorganic components. The powder mixture may have a particle size typically in the range of from about 1 to 20 microns, usually from about 1 to 15 microns, and often about 10 microns or less.

Step 304 may involve combining the inorganic components of the precursor material with a polymer binder. The polymer binder may comprise an organic polymer, such as ethyl cellulose or nitrocellulose. The polymer binder may be in the form of powdered ethyl cellulose or nitrocellulose, which may be dissolved in an organic solvent to form a polymer binder solution. The organic solvent may be terpineol, pine oil, and the like. Step 304 may involve combining the inorganic components of the precursor material with the polymer binder solution.

Step 306 may involve adjusting the viscosity of the precursor material. The viscosity of the precursor material may be adjusted by adding additional quantities of the inorganic components or of the polymer binder solution to the precursor material. The viscosity of the precursor material may be adjusted to a value typically in the range of from about 50,000 to 300,000 Centipoise, usually from about 100,000 to 300,000 Centipoise, and often from about 100,000 to 250,000 Centipoise.

FIG. 7 schematically represents a series of steps involved in a method 400 for forming a solid lubricant coating from a precursor material applied to a substrate surface, also according to the instant invention. Step 402 may involve providing the precursor material on the substrate surface. The precursor material may have those properties, characteristics, and components described elsewhere herein, and the precursor material may be prepared, for example, by method 300 (see FIG. 6). As an example, the precursor material may comprise a plurality of inorganic components, a polymer binder, and a solvent.

The inorganic components of the precursor material may include one or more bonding components. The bonding components may comprise at least one eutectic mixture which, upon melting on the substrate surface, bonds the inorganic components of the precursor material together to form the solid lubricant coating of the present invention; and, at the same time, bonds the solid lubricant coating to the substrate surface. The precursor material may be applied to the substrate surface, for example, as described with reference to step 108 of method 100 (see FIG. 4).

Step 404 may involve drying the precursor material, in situ, on the substrate surface. The precursor material may be dried by heating the precursor material to a first temperature sufficient to remove solvent from the precursor material. The first temperature may typically be in the range of from about 85 to 150° C., usually from about 95 to 150° C., and often from about 100 to 150° C. The first temperature may be maintained for a time period typically in the range of from about 5 to 60 minutes, usually from about 5 to 30 minutes, and often from about 10 to 15 minutes.

Step 406 may involve removing the polymer binder from the precursor material. The polymer binder may be removed from the precursor material by heating the precursor material to a second temperature. The second temperature may be sufficient to remove the polymer binder from the precursor material, but insufficient to melt the inorganic components of the precursor material. For example, the second temperature may be sufficient to combust and/or decompose the polymer binder, but may be below the melt temperature of the eutectic mixture of the precursor material.

As an example, the second temperature may typically be in the range of from about 350 to 475° C., usually from about 350 to 450° C., and often from about 400 to 450° C. Step 406 may involve heating, from the first temperature to the second temperature, at a rate of from about 5 to 20° C. per minute; followed by a hold period of typically at least about 10 minutes, and usually from about 10 to 20 minutes.

Step 408 may involve bonding the inorganic components of the precursor material, which may remain on the substrate surface after removal of solvent and polymer binder, to the substrate surface to form the solid lubricant coating. Step 408 may involve melting the inorganic components on the substrate surface. For example, step 408 may involve heating the inorganic components of the precursor material to a third temperature, wherein the third temperature may be sufficient to melt the inorganic components, but insufficient to thermally damage the substrate. As an example, the third temperature may be sufficient to melt the eutectic mixture of the precursor material, such that the inorganic components of the precursor material wet the substrate surface and bond thereto.

The third temperature may typically be in the range of from about 600 to 750° C., usually from about 600 to 725° C., and often from about 600 to 700° C. In some embodiments of the present invention, step 408 may involve heating the inorganic components of the precursor material, from the second temperature to the third temperature, at a rate of from about 5 to 20° C. per minute; followed by cooling, e.g., to ambient temperature, typically at a rate of from about 5 to 10° C. per minute.

Although the present invention may be described primarily with respect to foil bearings, solid lubricant coatings and methods of the present invention may also be applicable to many other types of substrates requiring high temperature lubrication, such as in oil-free bearings and oil-less pumps, and the like.

It should be understood, of course, that the foregoing relates to exemplary embodiments of the invention and that modifications may be made without departing from the spirit and scope of the invention as set forth in the following claims.

We claim:

1. A method for applying a solid lubricant coating to a substrate, comprising:
   a) preparing a surface of said substrate;
   b) thereafter, applying a paste to said surface of said substrate, wherein said paste comprises a precursor material comprising at least an organic component and at least an inorganic bonding component, said inorganic bonding component comprising a eutectic mixture; and
   c) forming said solid lubricant coating, on said surface, from said precursor material;
   wherein said step c) comprises melting said at least one inorganic bonding component in situ on said substrate surface, whereby said solid lubricant coating is bonded to said surface of said substrate.

2. The method of claim 1, wherein said step a) comprises chemically etching said surface of said substrate.

3. The method of claim 1, wherein said step a) comprises oxidizing said surface of said substrate.

4. The method of claim 1, wherein said precursor material further comprises at least one wear-resistant component and at least one friction-reducing component.

5. The method of claim 1, wherein said substrate comprises a top foil of a foil bearing.

6. A method for forming a solid lubricant coating from a precursor material on a substrate surface, the method comprising:
   a) applying a paste comprising said precursor material to said substrate surface, said precursor material comprising a plurality of inorganic components and an organic polymer binder, said plurality of inorganic components including at least one bonding component comprising a eutectic mixture;
   b) thereafter, removing said organic polymer binder from said precursor material; and
   c) thereafter, via said at least one bonding component, bonding said plurality of inorganic components to said substrate surface.

7. The method of claim 6, wherein said step a) comprises applying said paste having a viscosity of from about 100,000 to 250,000 Centipoise.

8. The method of claim 6, wherein said step a) comprises applying said precursor material to said substrate surface via thick film screen printing or tape transfer.

9. The method of claim 6, wherein said precursor material further comprises a solvent, and the method further comprises: d) prior to said step b), removing said solvent by heating said precursor material to a temperature of from about 100 to 150° C.

10. The method of claim 6, wherein said step b) comprises heating said precursor material to a temperature below a melt temperature of said at least one bonding component.

11. The method of claim 6, wherein said step b) comprises heating said precursor material to a temperature of from about 350 to 450° C.

12. The method of claim 6, wherein said step c) comprises heating said precursor material to a melt temperature of said at least one eutectic mixture.

13. The method of claim 6, wherein said step c) comprises heating said precursor material, at a rate of from about 5 to 20° C. per minute, to a melt temperature of from about 600 to 700° C.

14. The method of claim 12, further comprising: e) after said step c), cooling said substrate surface to ambient temperature at a rate of about 5 to 10° C. per minute.

15. A method for forming a solid lubricant coating on a substrate, comprising:
   a) providing said substrate;
   b) preparing a surface of said substrate;
   c) providing a paste comprising precursor material, wherein said precursor material comprises a plurality of inorganic components, a polymer binder, and a solvent; said plurality of inorganic components including at least one bonding component, at least one wear-resistant component, and at least one friction-lowering component, said at least one bonding component comprising a eutectic mixture;
d) after said step b), applying said paste to said surface;
e) heating said precursor material, in situ, on said surface to a first temperature sufficient to remove said solvent from said precursor material;
f) thereafter, heating said precursor material, in situ, on said surface to a second temperature sufficient to remove said polymer binder from said precursor material;
g) heating said precursor material, in situ, on said surface to a third temperature sufficient to melt said plurality of inorganic components on said surface; and
h) cooling said plurality of inorganic components on said surface, whereby said solid lubricant coating is bonded to said surface.

16. The method of claim 15, wherein said substrate comprises a superalloy, and wherein said step b) comprises chemically etching said surface or oxidizing said surface.

17. The method of claim 15, wherein said paste has a viscosity of from about 50,000 to 300,000 Centipoise, and wherein said step d) comprises applying said paste to said surface via thick film screen printing or tape transfer.

18. A method for applying a solid lubricant coating to a substrate surface, comprising:
   a) applying a paste comprising a first precursor material to said substrate surface, wherein said first precursor material comprises a first plurality of inorganic components and a plurality of organic constituents, wherein said first plurality of inorganic components includes at least one eutectic mixture;
   b) removing said plurality of organic constituents from said first precursor material;
   c) heating said first plurality of inorganic components to a melt temperature of said first plurality of inorganic components; and
   d) bonding said first plurality of inorganic components to said substrate surface to form a first layer of said solid lubricant coating on said substrate surface.

19. The method of claim 18, further comprising:
   e) after said step d), applying at least a second precursor material to said first layer of said solid lubricant coating, wherein said second precursor material comprises a second plurality of inorganic components and said plurality of organic constituents;
   f) removing said plurality of organic constituents from said second precursor material, in situ;
   g) heating said second plurality of inorganic components to a melt temperature of said second plurality of inorganic components; and
   h) bonding said second plurality of inorganic components to said first layer of said solid lubricant coating to form at least a second layer of said solid lubricant coating on said first layer of said solid lubricant coating.

20. The method of claim 19, wherein said first precursor material has a first composition, said second precursor material has a second composition, and wherein said first composition is different from said second composition.

* * * * *